United States Patent [19]
Wagner

[11] 3,841,696
[45] Oct. 15, 1974

[54] ADJUSTABLE TRACTOR SEAT

[75] Inventor: Robert J. Wagner, Milwaukee, Wis.

[73] Assignee: Allis-Chalmers Corporation, Milwaukee, Wis.

[22] Filed: Dec. 20, 1972

[21] Appl. No.: 316,986

[52] U.S. Cl................ 296/65 R, 248/420, 297/346
[51] Int. Cl............................................. B60n 1/02
[58] Field of Search........... 296/65 R; 248/419, 420, 248/424, 429, 393; 297/346

[56] References Cited
UNITED STATES PATENTS
| | | | |
|---|---|---|---|
| 2,954,071 | 9/1960 | Morrison et al. | 297/346 |
| 3,355,211 | 11/1967 | Kolle | 248/429 |
| 3,450,425 | 6/1969 | Leonhardt | 297/346 |

*Primary Examiner*—Philip Goodman
*Assistant Examiner*—John A. Carroll
*Attorney, Agent, or Firm*—Arthur L. Nelson

[57] ABSTRACT

An adjustable seat support for adjusting the vehicle seat vertically and horizontally by use of incline sliding rails and horizontal sliding rails with suitable latching means for retaining the seat adjustment.

10 Claims, 5 Drawing Figures

ADJUSTABLE TRACTOR SEAT

This invention relates to a vehicle seat and more particularly to an adjustable means employing incline sliding rails and horizontal sliding rails to individually adjust the seat vertically and horizontally by individual adjustments.

The seat for the operator of a tractor is generally provided with an adjustment to accommodate various sizes of operators. While it is generally assumed that a taller person will have longer legs and arms and accordingly, a seat adjustment which provides a vertical movement simultaneously with a horizontal movement would make a proper adjustment from a short operator to a tall operator. With this adjustment the seat would be moved vertically and rearwardly to accommodate the taller operator with respect to the previously positioned seat for the shorter operator. This assumption, however, is not necessarily true under all circumstances and accordingly an adjustment which moves the seat vertically and rearwardly simultaneously is not always adequate. Accordingly, this invention provides for compensation to the previously described adjustment to accommodate for operators who do not conform to the proportion which was described above. The additional adjustment on the seat provides for a horizontal adjustment together with the inclined seat adjustment and accordingly, this combination of adjustments for the seat will provide either a vertical adjustment, a horizontal adjustment, or a combined vertical and horizontal adjustment depending on a type of adjustment required for the particular operator.

It is an object of this invention to provide a seat support for a vehicle seat having vertical and horizontal adjustment.

It is another object of this invention to provide a simultaneous rearward and upward adjustment or a forward and downward adjustment in a single operation together with a single horizontal adjustment on a vehicle seat.

It is a further object to this invention to provide a seat adjustment inclined to a horizontal plane as a single seat adjusting operation and a horizontal seat adjustment as a second single seat adjustment thereby providing a vertical or horizontal adjustment or a combination vertical and horizontal adjustment of a seat.

The objects of this invention are accomplished by providing an operator station on a tractor which includes a platform and a seat mounted immediately rearwardly of the steering wheel. The seat is mounted on a base support connected to the vehicle carrying slide rails positioned inclined to a horizontal plane to provide a simultaneous vertical and horizontal adjustment for the seat. Horizontal slide rails are connected immediately under the seat to provide a horizontal adjustment only of the seat. Intermediate the seat and the base mounting is an intermediate support connected intermediate said inclined slide rails and said horizontal slide rails to provide connection between slide rails for either horizontal adjustment or horizontal and vertical adjustment of the seat position.

The attached drawings illustrate the preferred embodiment of this invention:

Figure 1:
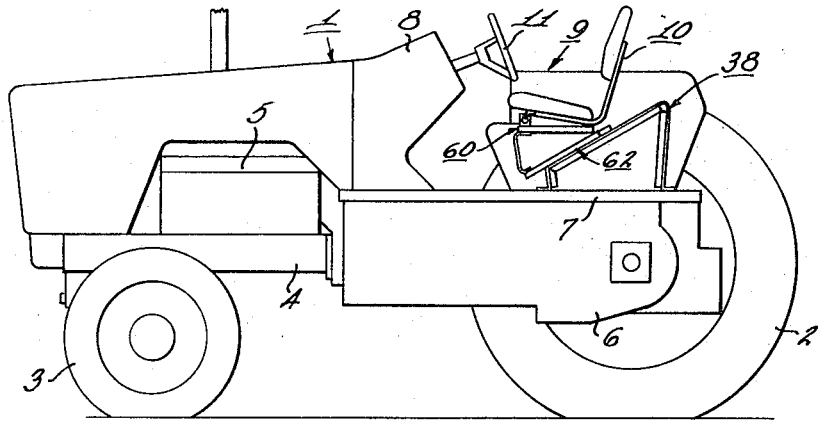
FIG. 1 illustrates a side elevation view with the seat on the tractor.

Referring to the drawings, FIG. 1 illustrates tractor 1 mounted on the wheels 2 and 3. The chassis 4 supports the engine 5 and the rear drive train 6. The platform 7 is supported on the chassis and the control console 8 is supported on the forward end of the operator station 9. The seat 10 is mounted on the rear portion of the vehicle above the platform 7. The steering wheel 11 extends from the control console 8 toward the seat 10.

Figure 2:
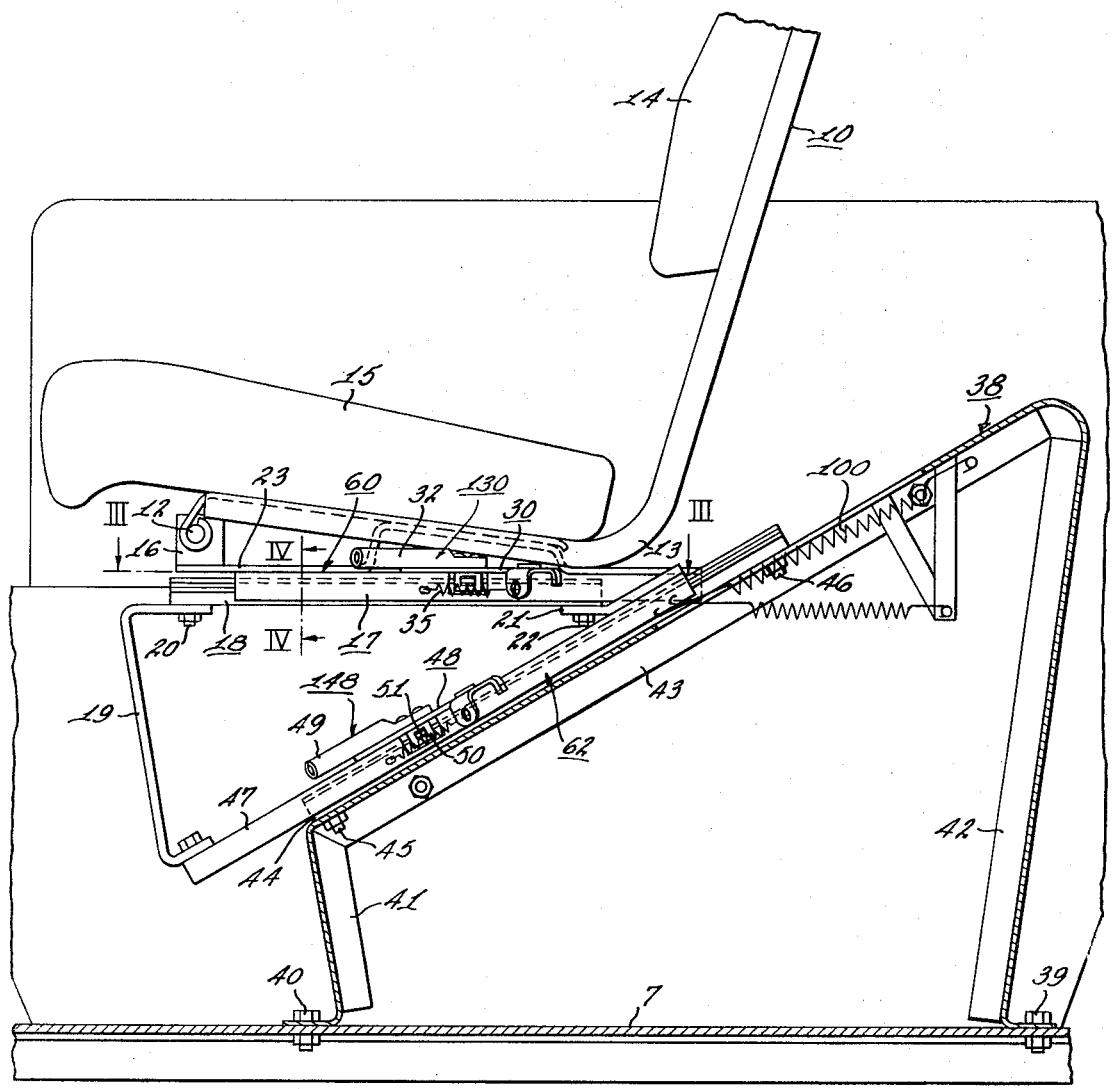
FIG. 2 illustrates a side elevation partially in section of the tractor seat.

The seat 10 is shown on its supporting structure in FIG. 2 which is an enlarged view. The seat 10 is pivoted on the pivot 12 on the forward underside of the seat. The seat rests on the rearward portion 13 in its operating position. The backrest 14 and a cushion 15 provide a resilient support for the operator.

A pivotal support bracket 16 is fastened to plate 23 and to the upper horizontal slide rail 17 on its forward end while the rearward portion 13 rests on the rearward portion of the upper horizontal slide rail 17 on its rearward end. The lower slide rail 18 is bolted to the bracket 19 by means of the bolts 20. The rearward portion of horizontal slide rail 18 is bolted to the metal strap 21 by means of the bolt 22. The base plate 23 extends the length of the upper horizontal slide rail 17. The upper horizontal slide rail 17 rolls on a plurality of rollers 24 which are supported on the lower horizontal slide rail 18. A roller cage 25 provides alignment for the roller 24 and the balls 26 and 27 immediate the upper horizontal slide rail 17 and the lower horizontal slide rail 18. A similar roller cage 28 aligns the roller 29 of the rearward portion of the slide rail. A symmetrical slide rail is positioned on the opposite side underneath the seat to provide support for the seat 10.

Figure 3:
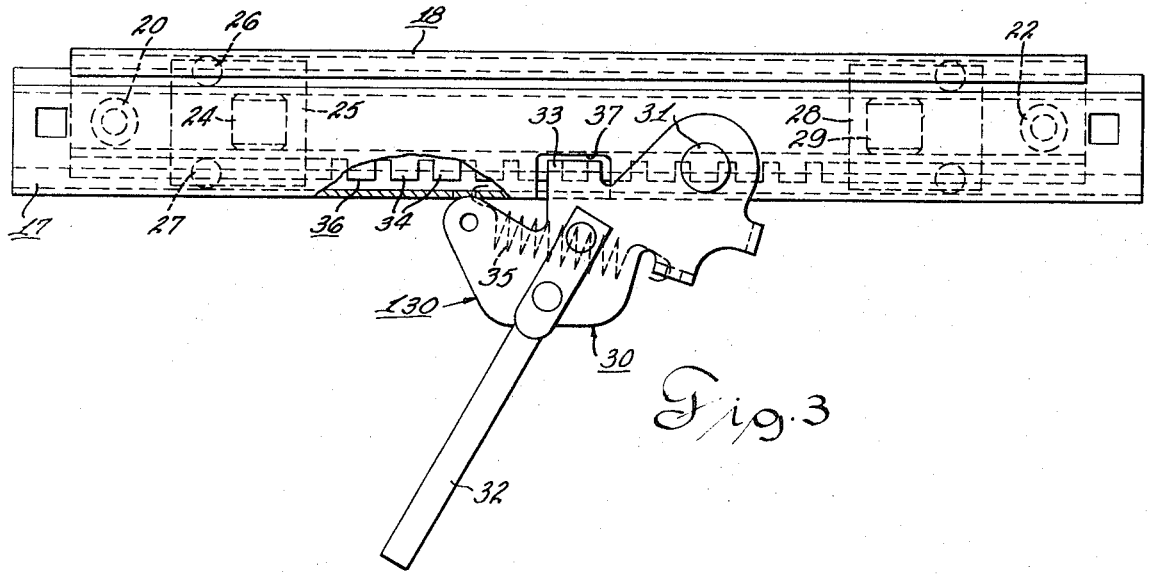
FIG. 3 is a view taken as viewed from the arrows III—III in FIG. 2.
Figure 4:
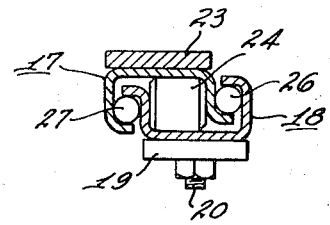
FIG. 4 is a cross-section view taken on line IV—IV of FIG. 2.
Figure 5:
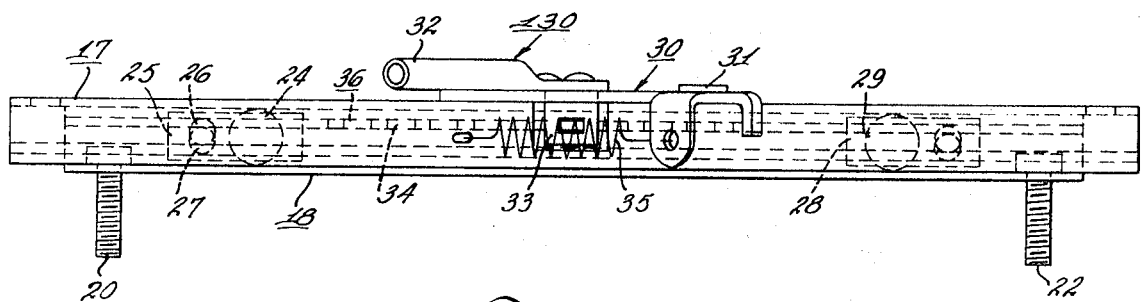
FIG. 5 is a side elevation view of the slide rails.

A latch arm 30 of latch 130 is pivotally supported on the pin 31 which is carried on the upper horizontal slide rail 17. The latch arm 30 carries a handle 32 which is used to operate the latch arm 30 which also forms a pawl 33 for engaging one of the plurality of teeth 34 in its latched position. The latch arm 30 is brased to an engaged position by means of the spring 35. The latching means is shown in the latched position in FIG. 3. The pawl 33 is permitted to engage the teeth 34 of the ratchet 36 in the lower slide rail 18 as it swings into the opening 37 in the upper horizontal slide rail 17.

A mounting bracket 38 is fastened by bolts 39 and 40 to the platform 7. The mounting 38 includes the upright section 41 and the upright section 42 which supports the slide rail carrier portion 43. The lower incline slide rail 44 is fastened by means of bolts 45 and 46. The upper inclined slide rail 47 rides on a plurality of rollers similar to rollers 24 and 29 or the horizontal slide rails. A similar set of balls are also employed in a cage similar to the cage 25 which are used on the upper horizontal slide rails.

The latch 148 is similar to that described above in the latch 130 on the horizontal slide rails. Each of the latches 148 and 130 are operated through a handle as indicated. The latch 148 includes the handle 49 which operates the pawl 50 to engage a tooth 51 on the upper incline slide rail 47. When it is desired to make a seat adjustment either the latch 130 is used to make a horizontal adjustment or the latch 148 is used to provide an incline rearward and upward adjustment or forward and downward adjustment.

The operation of this device will be described in the following paragraphs.

Referring to FIGS. 2, 3, 4 and 5 the seat and its adjustable support is shown in its preferred embodiment. The seat 10 is shown on the horizontal guide means 60 with an intermediate triangular support supporting the horizontal guide means 60. The inclined guide means 62 carries the intermediate support. The inclined guide means 62 are supported on the mounting 38. Accordingly it can be seen that provisions for adjusting seat in a horizontal direction are provided by the horizontal guide means 60 and provisions for adjusting the seat vertically and horizontally are provided for in the incline guide means 62. By adjusting the horizontal guide means 60 and the inclined guide means 62 the seat can be adjusted vertically, or horizontally, or vertically and horizontally.

The horizontal guide means 60 includes the upper horizontal guide rail 17 and the lower horizontal guide rail 18. The latch arm 30 is pivoted away from the slide rails and the pawl 33 disengages the tooth 34 permitting the slide rails to slide relative to each other. When the desired position is reached horizontally either forwardly or rearwardly the latch arm 32 is released and the spring 35 will then cause the pawl 33 to swing into the opening 37 and the pawl 33 will engage tooth 34 on the ratchet 36. This firmly locks the horizontal slide rails and fixes the seat adjustment at the position desired.

When a vertical and a horizontal adjustment is desired the incline guide means 62 which includes the upper incline slide rail 47 and the lower incline slide rail 44 are adjusted. The latch arm is pivotally moved away from the slide rails disengaging the pawl from a tooth of the upper slide rail 47. This releases the slide rails for movement relative to each other and allows the operator to make the seat adjustment. A provision for a return spring 100 to counteract the weight of the seat is provided to assist the operator in making a vertical and rearward adjustment upwardly. The weight of the seat will counterbalance the spring force and in making a downward adjustment the operator will press on the seat to force the seat in the downward forward direction.

Ordinarily when a vertical adjustment is desired the inclined slide rails 44 and 47 are adjusted upwardly the vertical amount desired by the operator. A compensating adjustment is then provided on the horizontal rails 17 and 18 to in effect cancel the horizontal component on the inclined slide rails and provide for a vertical adjustment only of the seat. Accordingly, it can be seen that with this dual adjustment of two sets of slide rails the seat can be adjusted vertically, horizontally, or vertically and horizontally as desired by the operator.

The embodiments of the invention in which an exclusive property or privilege is claimed are defined as follows:

1. A horizontally and vertically adjustable seat for a tractor, including a tractor, a platform mounted on said tractor, steering control means, and seat structure mounted on said tractor rearwardly of said steering control means defining an operator station, said seat structure including, a seat mounting on said tractor, rearwardly and upwardly inclined guide means mounted inclined rearwardly upward on said seat mounting for providing a vertical and horizontal adjustment of the seat simultaneously, a horizontal guide means for providing a horizontal adjustment of the seat, a seat mounted on said horizontal guide means, an intermediate support connected intermediate said inclined guide means and said horizontal guide means for providing vertical adjustment of said seat when moved forwardly and rearwardly relative to said seat mounting and said seat, a horizontal latching means on said horizontal guide means to lock said horizontal guide means in its adjusted position, an inclined latching means on said inclined guide means to latch said inclined guide means in its adjusted position, said horizontal guide means and said inclined guide means thereby providing adjustment and locking of said guide means to adjustably position said seat vertically or horizontally when desired by the operator.

2. A horizontally and vertically adjustable seat for a tractor as set forth in claim 1 wherein said horizontal guide means includes; a lower horizontal rail connected to said intermediate support, an upper horizontal rail connected to said seat to thereby provide sliding rails for making a horizontal seat adjustment.

3. A horizontally and vertically adjustable seat for a tractor as set forth in claim 1 wherein said inclined guide means includes; an upper slide rail connected to said intermediate support, a lower slide rail connected to said seat mounting thereby providing sliding rails for making horizontal and vertical seat adjustment simultaneously.

4. A horizontally and vertically adjustable seat for a tractor as set forth in claim 2 wherein said horizontal latching means includes; a latch arm including a pawl, a plurality of teeth forming a ratchet on said lower slide rail, a spring connecting said latch arm and said upper rail to normally bias said pawl for an engaging position with said ratchet.

5. A horizontally and vertically adjustable seat for a tractor as set forth in claim 3 wherein said inclined latching means includes; a pawl on a latch arm, a plurality of teeth forming a ratchet on said lower slide rail, a spring normally biasing said pawl to an engaging position with said ratchet.

6. A horizontally and vertically adjustable seat for a tractor as set forth in claim 1 wherein said seat mounting includes; means supporting said seat mounting on said platform.

7. A horizontally and vertically adjustable seat for a tractor as set forth in claim 1 including; means pivotally supporting said seat on said horizontal guide means.

8. A horizontally and vertically adjustable seat for a tractor as set forth in claim 1 wherein said inclined guide means includes an upper slide rail, a lower slide rail, a spring connected between said slide rails for normally biasing said upper guide rail to an upper position.

9. A horizontally and vertically adjustable seat for a tractor as set forth in claim 1 including; means supporting said seat mounting rearwardly of the steering control means on said platform, thereby providing a platform spacing for the operator immediately below and rearwardly of said steering control means for standing room of the operator.

10. A horizontally and vertically adjustable seat for a tractor as set forth in claim 1 wherein said horizontal guide means includes antifriction bearings, said inclined guide means includes antifriction bearings to thereby provide ease in adjustment of said seat.

* * * * *